United States Patent
Bugane

(12) 
(10) Patent No.: US 6,228,413 B1
(45) Date of Patent: *May 8, 2001

(54) METHOD OF COOKING PASTA AND A SPECIAL PAN WITH A LID

(76) Inventor: Primo Bugane, Via Modena 23, 10091 Alpignano (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/863,317

(22) Filed: May 27, 1997

(30) Foreign Application Priority Data

May 30, 1996 (IT) ................................. TO96A0467

(51) Int. Cl.[7] ................................................. A23L 1/00
(52) U.S. Cl. ............................................ 426/523; 426/275
(58) Field of Search .................... 426/275, 144, 426/94, 523

(56) References Cited

FOREIGN PATENT DOCUMENTS

| 4315379 | 7/1980 | (AU) . |
|---|---|---|
| 536205 | 4/1922 | (FR) . |
| WO/94/15512 | 7/1994 | (WO) . |

OTHER PUBLICATIONS

Dialog Data Base, File 47 (Magazine Database), Dialog Acc. No. 03903846, Abstracting McCall's, v120, n7, p152, Apr. 1993.*

Dialog Data Base, File 47 (Magazine Database), Dialog Acc. No. 04053952, Abstracting Ladies Home Journal, v111, n3, p140, Mar. 1994.*

Chernetz, B., "Our 17 Best New Pasta Dishes," *McCall's*, vol. 120, No. 7, cover and copyright pages pp. 152–156 (Apr. 1993).

Hazard, J., "Pasta Worth Waiting For," *Ladies' Home Journal*, vol. 111, No. 3, cover and copyright pages, pp. 140–144 (Mar. 1994).

* cited by examiner

*Primary Examiner*—George C. Yeung
(74) *Attorney, Agent, or Firm*—Merchant & Gould P.C.

(57) ABSTRACT

In a method of cooking pasta, a first layer (4) of tomatoes or tomato sauce is laid on the bottom of a pan (1) of anti-adhesive material, then a layer of pasta (3) to be cooked is laid uniformly on the tomato or tomato sauce layer (4). The pan is covered with a lid (5), and the tomato sauce layer (4) is brought to the boil and kept boiling until the pasta is completely cooked. The pan (1) has a bottom of anti-adhesive material with a set of valleys (2) of such dimensions as to allow flows of steam to be generated, whereby the turbulence within the pan is increased.

11 Claims, 1 Drawing Sheet

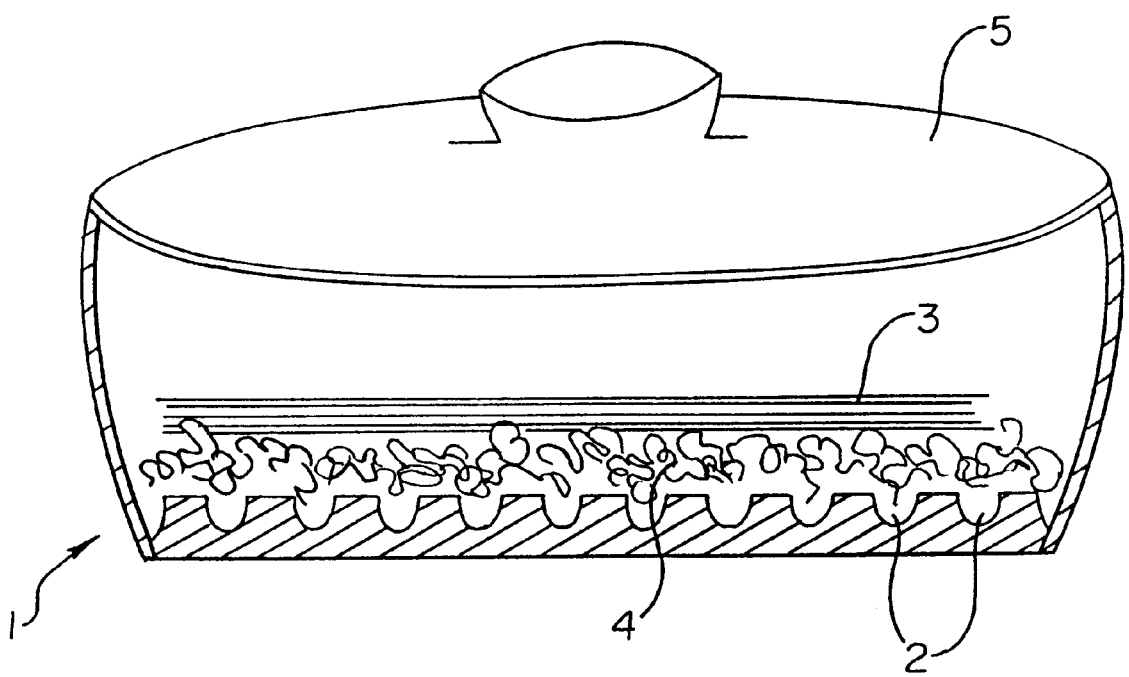

METHOD OF COOKING PASTA AND A SPECIAL PAN WITH A LID

FIELD OF THE INVENTION

The present invention refers to a method of cooking pasta and a special pan with a lid.

BACKGROUND OF THE INVENTION

As known, in the traditional way of cooking, pasta is boiled in a pot with a lid, and a separate saucepan is used for cooking the sauce. A number of tools is required for mincing various ingredients such as parsley, onion or garlic, basil, etc.; in addition, a colander and a soup-tureen for serving the pasta with the sauce at the table are also used. This normally has to be done rather quickly to prevent the pasta from overcooking.

The conventional boiled pasta method can in some cases involve a few problems due to the water being used. The water coming out of domestic taps has often a bad smell and taste owing to chlorine disinfectants that are added to the water to make it drinkable. Other negative factors are in some instances excessive ferrous and calcareous residues in the water. In any case, bacteriological purity of the water available can never be ascertained.

Further, the conventional boiling method may in some cases have a practical limit occurring when water is scarce or difficult to be found. Moreover, the boiling removes many nourishing substances from the pasta. Some of these substances are healthful, such as vitamins, amino acids, lysine, methionine, etc., but they are lost in the boiling water being strained.

SUMMARY OF THE INVENTION

Despite the conventional cooking method being in many ways satisfactory, the present invention provides an improvement to the cooking tecnhique of a dish that forms the basis of nutrition for many millions of people and of the so-called Mediterranean diet: pasta with tomato sauce.

Besides obviating the above discussed prior art inconveniences, it is a main object of the present invention to provide a method of cooking and a pan with a special lid for preparing a tasty and wholesome dish.

In accordance with one aspect of the invention as claimed, this object is accomplished by a cooking method. In accordance with another aspect of the invention as claimed, the above object is attained by the provision of a pan with a lid.

BRIEF DESCRIPTION OF THE DRAWING

In order that the present invention may be well understood there will now be described a preferred embodiment thereof, given by way of example, reference being made to the accompanying drawing, which is a schematical cross sectional view of a pan according to the present invention.

DETAILED DESCRIPTION OF THE PREFERRED EMBODIMENT

A layer of fresh or peeled tomatoes or tomato sauce is at first laid on the bottom of a pan of anti-adhesive material, with the optional addition of other ingredients such as parsley or basil, that needs not be minced, and onion or garlic, etc.

Then, on top of said first layer, a second layer of spaghetti or another kind of pasta to be cooked is laid down uniformly. Appropriate amounts of salt and oil should also added to the pasta. The pan must be covered and put on to cook with a moderate flame, without adding water. The tomato layer is to be brought to a boil. After a first period of about ten minutes, the pasta will lose its natural stiffness and will then have to be stirred amalgamating the whole. Then, the cooking has to be completed in a second period, generally shorter than the first, e.g. about five minutes long.

During cooking, the lid has to be kept on top of the pan to let the steam condense and fall back into the pan.

When pasta is cooked in this way it does not overcook; it takes a delicious taste as it absorbs the tomato sauce during cooking.

To cook greater amounts of pasta, several tomato layers and pasta layers are preferably to be disposed alternately to distribute the pasta uniformly in the sauce and reach a uniform degree of cooking in the whole pan.

Referring to the drawing, a pan in accordance with the present invention is designated overall by numeral 1. The bottom of the pan, of anti-adhesive material, has a set of valleys 2. During cooking, when the tomato sauce 4 is boiling, flows of steam are generated within the valleys 2, thereby increasing turbulence within the pan and permitting a uniform cooking of the pasta 3. The pasta shown in the drawing is of the thin and long spaghetti type, being it understood that any kind of pasta can be used.

The pan 1 has a lid 5, also of anti-adhesive material or Pyrex™, so as to recuperate the condensed steam and keep a constant rate of humidity within the pan, which is necessary for cooking the pasta properly.

While a specific embodiment of the invention has been disclosed, it is to be understood that such disclosure has been merely for the purpose of illustration and that the invention is not to be limited in any manner thereby. Particularly, as to the shape and dimensions of the pan and its valleys, various modifications will be apparent to those skilled in the art in view of the foregoing example.

What is claimed is:

1. A method of preparing thin and long pasta and a sauce in one pan, the pasta being uncooked prior to preparing the pasta and sauce, the method comprising steps of:

laying at least a first layer of tomatoes or tomato sauce on the bottom of a pan of anti-adhesive material provided with a set of valleys, the valleys configured to generate flows of steam therein, a portion of the first layer being positioned in the valleys;

uniformly laying the uncooked thin and long pasta on said first layer of tomatoes or tomato sauce;

covering the pan with a lid;

bringing said first layer of tomatoes or tomato sauce with the pasta to boil;

keeping humidity within the pan at a constant rate by collecting condensed steam, generated by moisture in the tomatoes or tomato sauce, on the lid and returning the condensed steam to the pasta and the first layer of tomatoes or tomato sauce;

mixing the pasta and the first layer of tomatoes or tomato sauce; and keeping the first layer of tomatoes or tomato sauce boiling until the pasta is completely cooked.

2. A method of cooking as claimed in claim 1, wherein a number of alternate layers of pasta and tomatoes or tomato sauce are disposed overlapping.

3. A method of cooking as claimed in claim 1, wherein said valleys (2) have such dimensions as to allow flows of steam to be generated, whereby the turbulence within the pan is increased.

4. A method of preparing thin and long pasta and a sauce in one pan, the pasta being uncooked prior to preparing the pasta and sauce, the method comprising steps of:

laying at least a first layer of tomatoes or tomato sauce on the bottom of a pan of anti-adhesive material provided with a set of valleys, the valleys configured to generate flows of steam therein, a portion of the first layer being positioned in the valleys;

uniformly laying the uncooked thin and long pasta on said first layer of tomatoes or tomato sauce;

covering the pan with a lid;

bringing said first layer of tomatoes or tomato sauce with the pasta to boil, each of said valleys having such dimensions as to allow flows of steam to be generated, whereby the turbulence within the pan is increased;

keeping humidity within the pan at a constant rate by collecting condensed steam, generated by moisture in the tomatoes or tomato sauce, on the lid and returning the condensed steam to the pasta and the first layer of tomatoes or tomato sauce;

mixing the pasta and the first layer of tomatoes or tomato sauce; and keeping the first layer of tomatoes or tomato sauce boiling until the pasta is completely cooked.

5. A method of cooking as claimed in claim 4, wherein a number of alternate layers of pasta and tomatoes or tomato sauce are disposed overlapping.

6. A method of preparing thin and long pasta and a sauce in one pan, the past being uncooked prior to preparing the pasta and sauce, the method comprising steps of:

laying at least a first layer of tomatoes or tomato sauce on the bottom of a pan of anti-adhesive material, the bottom of the pan configured to generate flows of steam;

uniformly laying the uncooked thin and long pasta on said first layer of tomatoes or tomato sauce;

covering the pan with a lid;

bringing said first layer of tomatoes or tomato sauce with the pasta to a boil;

keeping humidity within the pan at a constant rate by collecting condensed steam, generated by moisture in the tomatoes or tomato sauce, on the lid and returning the condensed steam to the pasta and the first layer of tomatoes or tomato sauce;

mixing the pasta and the first layer of tomatoes or tomato sauce; and keeping the tomatoes or tomato sauce boiling until the pasta is completely cooked.

7. A method of cooking as claimed in claim 6, wherein alternate layers of pasta and tomatoes or tomato sauce are disposed overlapping.

8. A method of cooking as claimed in claim 7, wherein said pan (1) has a bottom of anti-adhesive material with a set of valleys (2) of such dimensions as to allow flows of steam to be generated, whereby the turbulence within the pan is increased.

9. A method of preparing thin and long pasta and a sauce in one pan, the pasta being uncooked prior to preparing the pasta and sauce, the method comprising steps of:

overlapping a number of alternate layers of uniformly placed uncooked thin and long pasta and tomatoes or tomato sauce on the bottom of a pan of anti-adhesive material, the step of overlapping a number of alternate layers comprising:
(a) laying a first layer of tomatoes or tomato sauce on the bottom of the pan;
(b) laying a second layer of thin and long pasta on the first layer;
(c) laying a third layer of tomatoes or tomato sauce on the second layer; and
(d) laying a fourth layer of thin and long pasta on the third layer;
wherein the bottom of the pan comprises a plurality of concave valleys configured to generate flows of steam therein;

covering the pan with a lid;

bringing said tomatoes or tomato sauce with the past to boil with a moderate flame, the boiling held for a first time period;

keeping humidity within the pan at a constant rate by collecting condensed steam, generated by moisture in the tomatoes or tomato sauce, on the lid and returning the condensed steam to the pasta and the tomatoes or tomato sauce;

mixing the pasta and the tomatoes or tomato sauce; and keeping the tomatoes or tomato sauce boiling for a second time period shorter than the first time period until the pasta is completely cooked.

10. A method of cooking as claimed in claim 9, wherein said pan (1) has a bottom of anti-adhesive material with a set of valleys (2) of such dimensions as to allow flows of steam to be generated, whereby the turbulence within the pan is increased.

11. A method of cooking as claimed in claim 9, wherein the method further comprises the step of dropping condensed steam from the lid into the pan while mixing.

* * * * *